United States Patent [19]

Puskás

[11] 4,151,267

[45] Apr. 24, 1979

[54] PROCESS FOR PRODUCING ALUMINA

[76] Inventor: Ferenc Puskás, 23, Monostori ut, Budapest III., Hungary

[21] Appl. No.: 822,891

[22] Filed: Aug. 8, 1977

Related U.S. Application Data

[63] Continuation of Ser. No. 654,182, Feb. 2, 1976, abandoned.

[30] Foreign Application Priority Data

Feb. 3, 1975 [HU] Hungary .............................. PU 193

[51] Int. Cl.$^2$ .............................................. C01F 7/42
[52] U.S. Cl. ................................... 423/626; 423/627; 423/630; 423/631
[58] Field of Search ................ 423/626, 627, 630, 631

[56] References Cited

U.S. PATENT DOCUMENTS

| Re. 22,196 | 10/1942 | Heard .................................... 423/627 |
| 2,982,614 | 5/1961 | Csordas et al. ....................... 423/625 |

FOREIGN PATENT DOCUMENTS

| 1084705 | 7/1960 | Fed. Rep. of Germany ........... 423/627 |
| 46261 | 10/1962 | Poland .................................... 423/627 |
| 815514 | 6/1959 | United Kingdom ..................... 423/627 |

*Primary Examiner*—Herbert T. Carter

[57] ABSTRACT

Pure alumina is produced from aluminum metal by steps of activation by stripping the oxide layer in an acidic aqueous medium; washing in a neutral medium; reacting in a neutral, acidic or alkaline medium to give hydrated alumina; and igniting the hydrated alumina.

3 Claims, No Drawings

PROCESS FOR PRODUCING ALUMINA

This application is a continuation of Ser. No. 654,182, filed Feb. 2, 1976 and now abandoned.

The invention concerns a process for the production of pure alumina, principally alpha-alumina.

Because of the high present-day demands of technology, industry processing alumina for the production of oxide-based ceramic products requires the highest quality basic materials. The most important basic material of the oxide-based ceramic industry is alumina.

The quality of alumina is generally judged by its purity, its particle size and its crystalline form or modification. In the processing industry a purity of 99.99% or better is expected from the alumina starting material. In addition to the purity, requirements are a particle size generally less than one micrometer and the presence of only the alpha crystalline form, since these factors significantly influence the quality of the final product as well as the economy of the processing.

A difficulty in producing alpha-alumina arises from the stable alpha form being obtainable only by means of heat treatment taking place at a high temperature, in excess of 1500° C. At such a temperature the desired stable alpha form is given but the crystals coalesce into large groups or lumps, agglomerate and shrink. In this form the alumina is barely suitable for the manufacture of oxide-based ceramic products. Consequently, it must be subjected, for example, to grinding and even to classifying. However, in the course of comminution most of the alumina crystals are damaged, cracked, broken or crumbled and thereby lose some of their strength. The quality and strength of oxide-based ceramic products made from damaged crystals are lower than the quality and strength of products produced from undamaged crystals. To this should be added that during comminution the high purity alpha-alumina necessarily takes up contaminants which disadvantageously influence its quality.

Alumina of greater purity than technical grade alumina is produced from bauxite, but although generally these materials are produced to satisfy predetermined aims and demands, they do not satisfy demands for the highest quality materials, where the basic alumina materials are analysed for 10-15 components with an attendant purity requirement of 99.99%.

A higher degree of purity can be achieved with processes wherein, as starting material, a water-soluble aluminum salt or a thermally decomposable aluminum compound is employed. The weak point of these processes is generally the fact that for a unit amount of alumina a very large quantity and/or large volume of starting material is required. A good example of this is aluminum sulphate, which contains 18 molecules of water of crystallization, or aluminum ammonium sulphate, a frequently employed starting material for alumina produced by thermal decomposition. Undoubtedly, considering the ratio of the amounts of starting material and final product, the most favourable processes are those employing aluminum as starting material. Thus from 540 g metal 1020 g alumina can be produced. Clearly it is to this that one can attribute the fact that numerous processes are known for producing alumina from aluminum.

Thus it is known to powder aluminum and ignite to constant weight, and also to produce alumina by heating hydrated alumina produced in water by spark machining of aluminum. Further, numerous processes are known for producing hydrated alumina in pressurized reactors in the presence of mercury or a mercury salt.

It is also known to react aluminum at normal atmospheric pressure in the presence of water vapour, water, and mercury or a mercury salt, as a result of which hydrated alumina is obtained as long loose flakes or in an agglomerated state. In igniton of these loose flakes utilization of oven capacity is extraordinarily poor and the heat transfer between individual flakes is uneven; consequently undesirably high temperatures are necessary and the quality of the alumina is uneven.

In another method so-called thermal grinding is used for comminuting the agglomerated hydrated alumina. In this process, there is placed in an oven of suitable heat capacity that amount of wet hydrated alumina which can be heated in a single batch within at most two minutes to at least 1100° C. Under the effect of the vapour generated the material is comminuted, i.e., as it were, is thermally ground.

The aim of the present invention is to provide a process, simpler than those known hitherto, for the economic production of high purity alpha-alumina, expediently of sub-micronic particle size.

Accordingly the invention concerns a process for the production of alumina, principally pure alpha-alumina, wherein metallic aluminum of at least 99.5% purity is stripped of its oxide layer and is reacted in its thus activated state in an aqueous medium, and the reaction product resulting therefrom is heat-treated.

The essence of the invention lies in that the activation (removal of oxide layer) is performed exclusively in an aqueous solution of acidic pH value, a subsequent washing is performed exclusively in an aqueous solution of neutral pH value, and the reaction (to give hydrated alumina) is performed in an aqueous solution of alkaline, neutral or acidic pH value. In dependence on the alkaline, neutral or acidic pH value of the reaction solution, the hydrated alumina reaction product consists of fine particles and plate-like crystals or is in gel form. It is heat-treated in a known manner to produce the final product of alumina of fine, particulate, plate-like or chip-like form.

As starting material according to the invention aluminum metal of at least 8 cm$^2$/g specific area is desirable.

In a preferred process according to the invention, the alumina is produced from metallic aluminum (plate, foil, shavings, powder) of at least 99.5% purity and at least 8 cm$^2$/g specific area. In removing the protective oxide layer of the metal in a per se known manner, i.e. chemically, the aluminum metal is activated in an aqueous solution of acidic pH value. Subsequent washing is performed in water of neutral pH value. Then the activated and washed metal is transformed to hydrated alumina, in the presence of water, at normal atmospheric pressure and in a temperature range of 10° to 100° C. Then after heat treatment alumina is obtained.

The great advantage of the invention is that by changing only one technological parameter, alumina may be produced in a most simple manner and with apparatus which may easily be automated, which alumina has excellent properties and is, if desired, of fine particle size and plate-like crystalline structure.

The following Examples illustrate the process of the invention, without limitation.

EXAMPLE 1

To remove the oxide layer from 0.05 mm thick aluminum foil of at least 99.99% purity, and to activate its surface, it was passed through a bath at a rate of 10 m/min, which bath consisted of twice-distilled water containing 0.1% $HgCl_2$ and with its pH adjusted to 5 to 6 by means of hydrochloric acid. From the bath the foil was passed at the same rate of 10 m/min to a second bath containing twice distilled water of neutral pH(pH 7) wherein the salts and acids remaining on the surface of the metal after the activation were removed. The aluminum foil thus activated was further processed as follows.

The foil was passed at the rate already given to a bath containing twice-distilled water and with its pH adjusted to an alkaline value of 3-9 by means of a 25% aqueous solution of ammonium hydroxide. The temperature of the reaction solution was 80° to 90° C., the maintenance of the temperature at a constant value being ensured by equilibrium between production of heat of reaction and addition of cold make-up solution replacing reaction solution removed and passed to a filter. Vigorous exothermic reaction between the aluminum metal and the water produced a suspension of hydrated alumina in a fine, readily sedimenting form. The hydrated alumina crystals formed did not agglomerate into larger particles and during the subsequent processing they retained their sub-micronic particle size. Hydrated alumina particles of similar electric polarity or charge repel each other and this property ensures good filterability and the prevention of agglomeration.

The hydrated alumina crystals were continuously removed from the aqueous solution by filtration, then, by drying, a powder was produced. This hydrated alumina powder had a crystal size of 0.005 to 0.09 micrometers. From this hydrated alumina the gamma form of alumina could be obtained with a specific surface area of 25 to 30 $m^2/g$, by heating at 800° to 1000° C. By heating to 1000° to 1200° C. alumina a mixture of the gamma and alpha forms with a specific surface area of 15 to 25 $m^2/g$ could be obtained, and by heating between 1250° to 1800° C. alpha-alumina with a specific surface area of 10 to 15 $m^2/g$.

EXAMPLE 2

As starting material 99.99% pure aluminum foil was used, activated and washed as described in Example 1, but with twice-distilled water of neutral pH value in place of the alkaline reaction solution. As a result of the chemical reaction taking place a suspension of hydrated alumina of plate-like crystal form was obtained. From this material the following products could be obtained by heating: at 800° to 1000° C., gamma alumina powder of plate-like, crystal form and specific surface area 9 to 15 $m^2/g$; at 1000° to 1200° C., mixed gamma and alpha alumina powder of plate-like crystal form and specific surface area 5 to 9 $m^2/g$; and at 1250° to 1800° C. alpha alumina powder of plate-like crystal form and specific surface area of 1 to 5 $m^2/g$.

EXAMPLE 3

As starting material aluminum foil of 99.5% purity was used and the foil, activated and washed as described in Example 1, was reacted in an aqueous acidic solution of a pH between 5 and 6, acidified by hydrochloric acid. The product of the reaction was a gel of hydrated alumina. This material could not be filtered and thus was dried in its original condition, giving blocks or lumps of cracked structure. By heating this material at 800° to 1000° C. lumpy gamma alumina was obtained, specific surface area 10 to 15 $m^2/g$; by heating a 1000° to 1200° C. lumpy mixed gamma/alpha alumina was obtained, specific surface area 8 to 12 $m^2/g$; while by heating at 1400° to 1800° C. alpha alumina with a sub-micronic lattice was obtained, with at least 3.87 $g/cm^3$ solid specific gravity, a hardness of least 92 to 94 $HR_a$ and a flexural strength of 50 to 70 $kp/mm^2$, the alumina being in the form of splintery sinter bodies.

EXAMPLE 4

Aluminum shavings were used as starting material. After removal of the oxide layer and activation of the metal surface by means of chemical salt solutions for destroying the metal oxide (e.g. NaCl, KCl, $NH_4Cl$, $NH_4HCO_3$, ICl, $HgCl_2$, or gases dissolved in water e.g. $CO_2$, $SO_2$, $Cl_2$, $F_2$, or metallic mercury), the shavings were washed in twice-distilled water at neutral pH to remove the residues of the activation. Finally the shavings were reacted in a vibratory or ultrasonic reactor with the solutions described in Examples 1, 2 and 3. A material was obtained in each case which conformed with those described in the Examples.

EXAMPLE 5

Aluminum foil of at least 99.99% purity and at least 8 $cm^2/g$ specific surface area was passed through a twice-distilled aqueous solution of acidic pH value of 5 to 6 and through a layer of mercury at the bottom of the solution. Thereafter the procedure was as described in Examples 1, 2 and 3 and with the same results as described there.

EXAMPLE 6

As starting material there was used a granulate of aluminum of 99.5% purity and 8 $cm^2/g$ specific area made by spraying molten metal, through a protective barrier atmosphere, into the activation solution described in Example 1. The washing and reaction took place with the solutions of Examples, 1, 2 and 3 in three serially connected, continuously operated continuous-transfer tube reactors. The reactions and heat treatments resulted in the materials already described.

In the Examples the alumina produced had a purity equal to or greater than the purity of the starting aluminum.

I claim as my invention:

1. In a process for the preparation of pure alumina wherein metallic aluminum is activated, the activated metallic aluminum is reacted in a aqueous solution to obtain an intermediate and then the intermediate is heat treated to obtain an alumina end product, the improvement in producing said intermediate which comprises employing aluminum having a purity of at least 99.5% and a specific surface of at least eight $cm^2/g$, activating only the surface of the aluminum by contacting it with an aqueous acidic solution of (1) NaCl, KCl, $NH_4Cl$, $NH_4HCO_3$ or ICl or (2) water containing dissolved $CO_2$, $SO_2$, $Cl_2$ or $F_2$, then washing said aluminum having only its surface activated with an aqueous medium having a neutral pH; then reacting the washed only surface activated aluminum in an aqueous solution and adjusting the pH of such solution to a basic pH to produce a fine-grained alumina.

2. In a process for the preparation of pure alumina wherein metallic aluminum is activated, the activated metallic aluminum is reacted in a aqueous solution to obtain an intermediate and then the intermediate is heat treated to obtain an alumina end product, the improvement in producing said intermediate which comprises employing aluminum having a purity of at least 99.5% and a specific surface of at least eight $cm^2/g$, activating only the surface of the aluminum by contacting it with an aqueous acidic solution of (1) NaCl, KCl, $NH_4Cl$, $NH_4HCO_3$ or ICl or (2) water containing dissolved $CO_2$, $SO_2$, $Cl_2$ or $F_2$, then washing said aluminum having only its surface activated with an aqueous medium having a neutral pH; then reacting the washed only surface activated aluminum in a aqueous solution and adjusting the pH of such solution to an acidic pH to produce an alumina gel.

3. In a process for the preparation of pure alumina wherein metallic aluminum is activated, the activated metallic aluminum is reacted in a aqueous solution to obtain an intermediate and then the intermediate is heat treated to obtain an alumina end product, the improvement in producing said intermediate which comprises employing aluminum having a purity of at least 99.5% and a specific surface of at least eight $cm^2/g$, activating only the surface of the aluminum by contacting it with an aqueous acidic solution of (1) NaCl, KCl, $NH_4Cl$, $NH_4HCO_3$ or ICl or (2) water containing dissolved $CO_2$, $SO_2$, $Cl_2$ or $F_2$, then washing said aluminum having only its surface activated with an aqueous medium having a neutral pH; then reacting the washed only surface activated aluminum in a aqueous solution and adjusting the pH of such solution to a neutral pH to produce alumina in a plate-like crystalline form.

* * * * *